United States Patent Office 3,103,532
Patented Sept. 10, 1963

3,103,532
BORON PRODUCTS
Fred J. Dykstra, Detroit, Mich., assignor to Ethyl Corporation, New York, N.Y., a corporation of Virginia
No Drawing. Filed Nov. 6, 1961, Ser. No. 150,183
12 Claims. (Cl. 260—462)

This invention relates to a novel chemical reaction involving certain esters of boron and basic nitrogen compounds, this reaction being useful in the chemical and allied arts, and to the novel and useful chemical products obtained therefrom.

Among the objects of this invention is that of providing novel and useful chemical reactions involving certain esters of boron acids and basic nitrogen compounds and the novel and useful products obtained therefrom. Other important objects of this invention will be apparent from the ensuing description.

The above and other objects of this invention are achieved by a process which comprises reacting an ester of a metaboric acid with a basic nitrogen compound in an inert, essentially anhydrous solvent. The nitrogen compound is basic in the Lewis sense, that is, it is a nitrogen compound which is capable of donating electrons during chemical reaction. For further details concerning bases in the Lewis sense, see Luder and Zuffanti, "Electronic Theory of Acids and Bases." The basic nitrogen compound should have an ionization constant, characteristic of a base, of at least $1 \times 10^{-12}$ as measured in aqueous solution. The process of this invention is highly selective and is characteristic of metaborate esters. A corresponding reaction does not occur when orthoborate esters are used.

Adducts are formed in high yield during the process of this invention. These adducts are addition products between the metaborate ester and the basic nitrogen compound. Ordinarily, the boron-to-nitrogen atom ratio of the adduct is approximately 3:1 respectively, although this ratio varies from about 2.5:1 to about 7:1, depending upon the reactants, solvent and reaction conditions used. As will be brought out hereinafter, these adducts are novel and useful chemical products and thus constitute an embodiment of this invention.

The metaborate esters used in carrying out this invention have the empirical formula

RYBZ wherein R is selected from the group consisting of alkyl, aralkyl, cycloalkyl, aryl, alkaryl, alkoxyalkyl, poly(alkoxy)-alkyl, and aryloxyalkyl; and Y and Z are selected from the group consisting of oxygen and sulfur. It is preferable that the R groups contain no more than about 18 carbon atoms, although in most cases, R groups containing up to about 8 carbon atoms give the best results and, for this reason, are particularly preferred. Under normal conditions—i.e., ambient temperatures and pressures—the above esters of metaboric acids exist as trimers having the formula

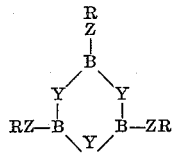

wherein R, Y and Z are as designated above.

The most particularly preferred boron reagents used in this invention are esters of metaboric acid. In other words, Y and Z in the above formula are both oxygen in these most preferred compounds.

The basic nitrogen compounds which undergo the novel reaction of this invention are exemplified by amines (primary, secondary or tertiary), diamines, hydrazines, imines, heterocyclic nitrogen bases and, in general, organic and inorganic nitrogen compounds which have an ionization constant of at least $1 \times 10^{-12}$ as measured in aqueous solution. The basic organic nitrogen compounds which can be used in practicing this invention can be substituted with other functional groups, the number and type of which are limited only to the extent that these other functional groups do not cause the organic nitrogen compound to have a basic ionization constant of less than $1 \times 10^{-12}$. Thus, the basic organic nitrogen compounds used in this invention may be substituted with such functional groups as carbonyl, carboxylic, hydroxyl, sulfhydryl, halogen, nitro, nitroso, nitrile and other functional groups provided the organic nitrogen compound has an ionization constant of at least $1 \times 10^{-12}$. The basic organic nitrogen compounds can be mono- or polyamines—i.e., mono- or polyamino substituted organic compounds. Similarly, the basic organic nitrogen compound can be a heterocyclic organic nitrogen base which contains one or more heterocyclic nitrogen atoms and in addition, the heterocyclic ring or other parts of the molecule may be substituted with other atoms, such as oxygen or sulfur. The chief requisite of the basic nitrogen compound is its basic strength as reflected by the ionization constant which it possesses.

More specifically, the basic nitrogen compounds which can be used in practicing this invention are:

(1) Compounds having the formula

wherein the molecule contains from zero to about 22 carbon atoms, and R, $R_1$ and $R_2$ are selected from the group consisting of hydrogen and alkyl, alkenyl, aryl, aralkyl, alkaryl, cycloalkyl, alkoxy and naphthyl radicals containing up to about 10 carbon atoms. Alkyl amines having one to three alkyl groups of from 1–6 carbon atoms are preferred.

(2) Compounds having the formula

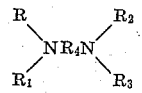

wherein the entire molecule contains from 2 to about 24 carbon atoms; R, $R_1$, $R_2$ and $R_3$ are defined as in (1) above and $R_4$ is selected from the group consisting of aliphatic and aromatic divalent hydrocarbon groups. In the preferred compounds, R, $R_1$, $R_2$ and $R_3$ are alkyl groups having from one to 6 carbon atoms or hydrogen, and $R_4$ is phenylene.

(3) Compounds having the formula

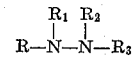

where R, $R_1$, $R_2$ and $R_3$ are selected from the group consisting of alkyl radicals having from one to 6 carbon atoms, and aryl hydrocarbon groups containing from 6 to about 10 carbon atoms, and hydrogen.

(4) Compounds having the formula

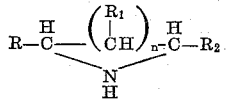

containing from 2 to about 22 carbon atoms, wherein R, $R_1$ and $R_2$ are hydrogen or alkyl groups containing one to 6 carbon atoms, and $n$ is a small integer ranging from zero to 3, preferably 2 or 3; and the aforesaid compounds containing from one to three double bonds in the ring.

(5) Compounds having the formula $$R=NH$$

where R is a bivalent radical selected from the group consisting of lower alkylidene, cycloalkylidene, and aralkylidene radicals having from 7 to about 10 carbon atoms.

(6) Heterocyclic nitrogen bases selected from the group consisting of morpholine, pyrazine, and quinoline, and the aforesaid heterocyclic nitrogen bases substituted with from one to 4 lower alkyl groups.

The compounds defined in 1–6 above, substituted with functional groups selected from the group consisting of carbonyl, carboxyl, hydroxyl, sulfhydryl, halogen, nitro, nitroso, and nitrile groups, may also be used as the basic nitrogen compound of this invention.

The solvent which is used in the process of this invention is inert to the reactants; namely, the metaborate ester and the basic nitrogen compound, and to the adduct formed. Suitable solvents for use in the practice of this invention include paraffinic and aromatic hydrocarbons, halogenated hydrocarbons, esters, ethers, and ketones. In most cases, any of these inert solvents can be used. In some cases, however, a precipitate is not formed when using certain of the above solvents. In such cases, the addition of a paraffinic hydrocarbon, such as petroleum ether, to the reaction solvent used will engender the formation of the precipitate and completion of the reaction.

The process of this invention is conducted under essentially anhydrous conditions—e.g., the solvent is essentially anhydrous—because metaborate esters undergo hydrolysis in the presence of water. However, relatively small amounts of water can be present when conducting the process of this invention. Under this circumstance, a portion of the metaborate ester is consumed in reacting with the water present, thereby removing the water from the reaction system. Thus, the remaining metaborate ester reacts with the basic nitrogen compound to form the adducts of this invention. It will be apparent, however, that it is advantageous to conduct the process of this invention under as anhydrous conditions as are convenient or practicable, because under these conditions, excessive amounts of metaborate ester are not consumed by reaction with water and the adducts formed are free of contamination with hydrolysis products. Under no circumstances can the process of this invention be carried out in water as a solvent.

Numerous advantages accrue from the practice of this invention. The products formed are new and useful in the chemical and allied arts. Moreover, the process itself is simple to conduct and thus does not require complicated or expensive reaction equipment. Furthermore, the reaction conditions are mild—i.e., the reaction can be carried out at room temperatures and pressures and no special precautions are necessary except for the avoidance of excessive amounts of water in the reaction medium. In addition, many of the adducts of this invention are insoluble in common organic solvents which are suitable for use in the reaction proper. Thus, the adducts are easily recovered in high yield and purity.

The following specific examples in which all parts are by weight illustrate various aspects of this invention. All reactions were carried out at room temperature unless otherwise specified.

EXAMPLE 1

0.4 part of n-butyl metaborate was dissolved in a mixture of 7 parts of n-octane and 9 parts of toluene. To this solution was added one part of n-butyl amine. A white solid adduct between n-butyl amine and n-butyl metaborate was formed at room temperature and settled to the bottom of the reaction vessel.

EXAMPLES 2–32

| Ex. | Metaborate ester (parts) | Basic nitrogen compound (parts) | Solvent (parts) | Characteristics of adduct formed |
|---|---|---|---|---|
| 2 | n-Butyl metaborate (0.4) | Benzyl amine (1) | n-Octane (7) and toluene (9) | White solid, insoluble in the solvent. |
| 3 | do | Allyl amine (1) | do | Do. |
| 4 | do | Diethylamine (1) | do | Do. |
| 5 | do | Di-n-propyl amine (1) | do | Do. |
| 6 | do | Dibenzyl amine (1) | do | Do. |
| 7 | do | Triethylamine (1) | do | Do. |
| 8 | do | Aniline (1) | do | Do. |
| 9 | do | o-Toluidine (1) | do | Do. |
| 10 | do | B-Naphthyl amine (1) | do | Do. |
| 11 | do | 2,6-diethyl aniline (1) | do | Do. |
| 12 | do | N-ethyl aniline (1) | do | Do. |
| 13 | do | N,N-dimethyl aniline (1) | do | Do. |
| 14 | do | N,N-diethyl aniline (1) | do | Do. |
| 15 | do | p-Phenylene diamine (1) | do | Do. |
| 16 | do | N,N'-diphenyl-p-phenylene diamine (1). | do | Brown solid, insoluble in the solvent. |
| 17 | do | Pyridine (1) | do | White solid, insoluble in the solvent. |
| 18 | do | 2-picoline (1) | do | Do. |
| 19 | do | 3-picoline (1) | do | Do. |
| 20 | do | 2,6-lutidine (1) | do | Do. |
| 21 | do | Quinoline (1) | do | Do. |
| 22 | do | Quinaldine (1) | do | Do. |
| 23 | do | Morpholine (1) | do | Do. |
| 24 | do | Piperidine (1) | do | Do. |
| 25 | Benzyl metaborate (0.5) | Pyridine (2) | Benzene (18) and isooctane (14) | White solid insoluble in hydrocarbons having a small vapor pressure at 100° C. and a melting point of 156-7° C. |
| 26 | do | Quinoline (0.2) | do | White solid melting at 197-9° C. insoluble in hydrocarbons and stable in vacuo at 100° C. |
| 27 | do | Ethylene diamine (0.2) | do | White solid insoluble in the solvent. |
| 28 | do | N-ethyl aniline (0.2) | do | Do. |
| 29 | do | Triethylamine (0.2) | do | White solid having an appreciable solubility in the solvent at 25° C. |
| 30 | n-Butyl metaborate (0.4) | n-Hexyl amine (1) | n-Octane (7) and toluene (9) | White solid soluble in the solvent but readily precipitated therefrom by adding 20 parts of petroleum ether. |
| 31 | do | 2-ethylhexylamine (1) | do | Do. |
| 32 | do | Di-n-butyl amine (1) | do | Do. |

EXAMPLE 33

To show the selectivity of the process of this invention, comparative experiments were conducted. In these experiments various basic nitrogen compounds were contacted at 25° C. in appropriate reaction solvents with metaborate esters or with the corresponding orthoborate esters. The results of these experiments are presented in the following table:

*Relative Reactivities of Metaborate and Orthoborates With Basic Nitrogen Compounds*

| Borate ester | Basic nitrogen compound | Solvent | Results |
| --- | --- | --- | --- |
| Isopropyl metaborate | Pyridine | Toluene | Reaction occurred forming a white solid adduct. |
| Triisopropyl orthoborate | do | do | No reaction occurred. |
| Benzyl metaborate | Triethylamine | Petroleum ether | Reaction occurred forming a white solid adduct. |
| Tribenzyl orthoborate | do | do | No reaction occurred. |
| Benzyl metaborate | do | Carbon tetrachloride | Reaction occurred forming a white solid adduct. |
| Tribenzyl orthoborate | do | do | No reaction occurred. |
| Isopropyl metaborate | Quinoline | Methylene dichloride | Reaction occurred forming a white solid adduct. |
| Triisopropyl orthoborate | do | do | No reaction occurred. |

EXAMPLE 34

Into a solution of one part of isopropyl metaborate dissolved in 20 parts of toluene is passed 0.06 part of ammonia gas, the reaction temperature being 25° C. A white adduct between ammonia and isopropyl metaborate is formed.

EXAMPLE 35

At 30° C., 0.6 part of isoquinoline is contacted with one part of methyl metaborate in 20 parts of a commercial aviation gasoline of grade 115/145 as solvent. A methyl metaborate-isoquinoline adduct is formed.

EXAMPLE 36

To one part of p-tolyl metaborate dissolved in 20 parts of amyl acetate is added 0.7 part of 4-aminodiphenylamine. The reaction temperature is 40° C. An adduct between 4-aminodiphenylamine and p-tolyl metaborate is formed.

EXAMPLE 37

In 20 parts of diethylether held at 0° C. are contacted 0.08 part of trimethylamine and one part of octadecyl metaborate. An octadecyl metaborate-trimethylamine adduct is formed.

EXAMPLE 38

To a solution of 1.1 parts of strychnine in 20 parts of carbon tetrachloride at 50° C. is added one part of O-hexyl thiometaborate. An adduct between strychnine and O-hexyl thiometaborate results.

EXAMPLE 39

To a solution of one part of S-isopropyl metaborate dissolved in 20 parts of diethylmalonate at 100° C. is added 0.3 part of piperazine. There results an adduct between piperazine and S-isopropyl metaborate.

EXAMPLE 40

To 20 parts of ethylene dichloride held at 70° C. are added 0.15 part of pyrrole and one part of S-isooctyl thiometaborate. An adduct between pyrrole and S-isooctyl thiometaborate is formed.

EXAMPLE 41

At 80° C. one part of β-ethoxyethyl metaborate and 0.7 part of ortho toluidine are mixed with 20 parts of dioxane. An ortho toluidine-β-ethoxyethyl metaborate adduct is formed.

EXAMPLE 42

In 20 parts of xylene at 60° C. are dissolved 0.4 part of carbazole and one part of O-octyl thiometaborate. A carbazole-O-octyl thiometaborate adduct is formed.

EXAMPLE 43

To a solution of one part of cyclohexyl metaborate dissolved in five parts of cyclohexane and 15 parts of benzene is added 0.5 part of 4-aminodiphenyl. The temperature is 30° C. A cyclohexyl metaborate-4-aminodiphenyl adduct is formed.

Additional reactions contemplated by this invention are shown in the following examples wherein adducts are formed between the indicated reactants.

EXAMPLES 44-59

| Ex. | Metaborate ester (parts) | Basic nitrogen compound (parts) | Solvent (parts) |
| --- | --- | --- | --- |
| 44 | n-Butyl metaborate (1.0) | 2-hexenylamine (0.1) | n-Octane (12), toluene (15). |
| 45 | do | N-butylaniline (0.35) | Do. |
| 46 | do | 2-phenylhexylamine (0.2) | Do. |
| 47 | do | N,N'-diethyl-p-phenylenediamine (.1) | Do. |
| 48 | do | N-phenyl-N'-propylethylenediamine (0.3) | Do. |
| 49 | do | N,N'-dihexenyl-1,3-propanediamine (0.2) | Do. |
| 50 | do | 1,2-diphenylhydrazine (0.35) | Do. |
| 51 | do | 1-phenyl-1-propyl-2-ethyl hydrazine (0.1) | Do. |
| 52 | do | Tetraethylhydrazine (0.1) | Do. |
| 53 | do | Aziridine (0.08) | Do. |
| 54 | do | Hexmethylenimine (0.1) | Do. |
| 55 | do | 2-isopropyl pyrrolidine (0.2) | Do. |
| 56 | do | Tetramethylenediamine (0.1) | Do. |
| 57 | do | Hexylidenimine (0.15) | Do. |
| 58 | do | Cyclohexanimine (0.08) | Do. |
| 59 | do | Dimethylpyrazine (0.1) | Do. |

EXAMPLES 60-68

| Ex. | Metaborate ester (parts) | Basic nitrogen compound (parts) | Solvent (parts) |
| --- | --- | --- | --- |
| 60 | n-Butyl metaborate (1.0) | 2-propylmorpholine (0.15) | n-Octane (12), toluene (15). |
| 61 | Benzyl metaborate (1.0) | Cyclohexylamine (0.08) | Benzene (20), isooctane (16). |
| 62 | do | Propyl-1-naphthylamine (0.06) | Do. |
| 63 | do | N-isopropyl-N'-tolyl-3-methyl-p-phenylenediamine (0.1) | Do. |
| 64 | do | (p-Butylphenyl) hydrazine (0.2) | Do. |
| 65 | do | Propyl-2-tolylhydrazine (0.1) | Do. |
| 66 | do | Pyrrole (0.08) | Do. |
| 67 | do | Benzylidenimine (0.25) | Do. |
| 68 | do | 1-phenylbutylidenimine (0.10) | Do. |

Because of its selectivity, the process of this invention is of particular utility as a means of separating basic nitrogen compounds from other materials. Thus, basic nitrogen compounds are easily separated from natural products, such as coal tar, nitrogen-containing fractions of petroleum and shale oil, chemical reaction mixtures containing basic nitrogen compounds such as xylidine streams, etc., by causing the basic nitrogen compounds to react with a metaborate ester. Thus, the process of this invention is of particular utility in the recovery of alkaloids from plants. To illustrate, the isolation of the alkaloids usually begins with the treatment of the plant or its acidic aqueous extract with alkalis. The plant bases are thus liberated from their salts and are separated by extraction with ether, chloroform or the like. Thus, these extracts can then be contacted with a metaborate ester whereby adducts between the alkaloids and the metaborate ester are formed which are then separated from the solvent. Moreover, the adducts of this invention once separated from the residual material can be treated so as to recover therefrom the basic nitrogen compounds in their original condition. Accordingly, the process of this invention enables the separation and recovery of rare and important basic nitrogen compounds which are present even in small quantity in various natural products.

Another embodiment of this invention is the process of liberating a basic nitrogen compound from an adduct between a metaborate ester and a basic nitrogen compound which process comprises decomposing the adduct under conditions such that the basic nitrogen compound is substantially undecomposed. One means of effecting this process is to mix the adduct with water whereby the adduct is broken down liberating the nitrogen compound. Another method is to displace the basic nitrogen compound from the adduct by means of a stronger organic base. Still another method is thermal decomposition which is best conducted by heating the adduct while under reduced pressure, although atmospheric pressure can be used. Temperatures ranging from about 125–300° C. are effective for this purpose. The preferred method, however, is to decompose the adduct by means of an aqueous solution of inorganic base especially a hydroxide of an alkali or alkaline earth metal, such as sodium hydroxide, potassium hydroxide, calcium hydroxide, etc. This method causes the metaborate ester to decompose thereby liberating the basic nitrogen compound. Elevated temperatures of from about 125–300° C. in this method are useful. After this decomposition has been effected, the basic nitrogen compounds are recovered by steam distillation, by extraction with organic solvents or the like. To further illustrate the methods of liberating basic nitrogen compounds from their metaborate ester adducts, the following specific examples are presented. In these examples all parts are by weight.

EXAMPLE 69

In a reaction vessel equipped with heating and condensing means was placed a slurry of 9.9 parts of the adduct between isopropyl metaborate and pyridine, 21.6 parts of petroleum ether, 25.3 parts of benzene and 12.7 parts of toluene. This slurry was then heated to 95° C. to remove therefrom all of the benzene and petroleum ether. Then the temperature was raised to 300° C. and a pyridine-rich fraction was collected in the condensing apparatus. To this fraction, amounting to 30.3 parts, was added 200 parts of water. Then, 10 parts of sodium hydroxide were added to this aqueous mixture so that the pH exceeded 13. This mixture was then extracted with 90 parts of benzene in which the pyridine was preferentially soluble. The presence of pyridine in this extract was established by forming the 3,5-dinitrobenzoic acid derivative of pyridine, which melted at 170.5–171.5° C. (literature: 171.3° C.).

EXAMPLE 70

To a reaction vessel equipped with heating and condensing means was added 18.8 parts of the pyridine-isopropyl metaborate adduct, 24.3 parts of toluene, 41.2 parts of petroleum ether, and 48.3 parts of benzene. To this mixture was added 500 parts of water and the mixture steam distilled, whereby the distillate comprised an aqueous layer in contact with an organic layer. The aqueous layer was separated from the organic layer and the aqueous layer was treated with 20 parts of sodium hydroxide. This basic aqueous solution was then extracted with benzene. The presence of pyridine in this benzene extract was confirmed by preparing the 3,5-dinitrobenzoic acid derivative described in Example 69.

EXAMPLE 71

To a reaction vessel containing 8.6 parts of the isopropyl metaborate-pyridine adduct, 18.8 parts of petroleum ether, 22.1 parts of benzene, and 11.1 parts of toluene was added 300 parts of water. This mixture was then stirred at 25° C. for 15 minutes. The stirring was discontinued and the system formed two layers, an aqueous layer and an organic layer. The aqueous layer was separated and then treated with 10 parts of sodium hydroxide. The resulting basic aqueous system was then extracted with 90 parts of benzene, in order to separate the pyridine which had been liberated. The presence of pyridine in this benzene extract was confirmed by preparing the above 3,5-dinitrobenzoic acid derivative.

EXAMPLE 72

In a reaction vessel equipped with heating, condensing, and pressure-reducing means were placed a solution of 14.6 parts of isopropyl metaborate in 115.7 parts of toluene and a solution of 5.1 parts of pyridine in 87.1 parts of toluene. At 25° C. a white, insoluble adduct between pyridine and isopropyl metaborate was formed. The majority of the toluene was then removed from the reaction vessel by maintaining the system at 5 to 10 mm. of mercury pressure at 25° C. for four hours. The white, solid adduct remaining in the reaction vessel was then heated to 150° C. at 1.0 to 1.5 mm. of mercury pressure for eight hours. During this time the adduct was decomposed and the pyridine, thereby liberated, was collected in the condensing means. A white, boron-containing solid was left in the reaction vessel.

The novel adducts of this invention are useful for a variety of purposes. Some of these adducts are particularly effective as antioxidants for plastics and rubber, both natural and synthetic. By way of example the adduct between isopropyl metaborate and N-phenyl-β-naphthylamine and the adduct between benzyl metaborate and N,N'-di-α-naphthyl-p-phenylenediamine are exceptionally effective rubber antioxidants. Amounts of these and other adducts of this invention between about 0.05 and about 2 percent by weight in rubbery high molecular weight organic polymers provide improved resistance to the deterioration normally resulting from contact with oxygen, air or ozone. Thus, the adducts of this invention formed from aromatic amines are effective antioxidants in such materials as natural rubber, polystyrene, polyethylene, GR–S and GR–N copolymers, polybutylene and related high molecular weight polymers composed chiefly of carbon and hydrogen. Such polymers can also contain relatively small amounts of nitrogen and/or sulfur in chemically combined form.

Representative alkyl metaborate esters used in accordance with this invention include methyl metaborate, ethyl metaborate, propyl metaborate, isopropyl metaborate, n-butyl metaborate, isobutyl metaborate, sec-butyl metaborate, tert-butyl metaborate, and likewise the various isomeric forms of amyl metaborate, hexyl metaborate, heptyl metaborate, octyl metaborate, nonyl metaborate, decyl metaborate, undecyl metaborate, dodecyl metaborate, octadecyl metaborate, etc. Typical of the cycloalkyl metaborates are cyclohexyl metaborate, the various methyl cyclohexyl metaborates, and the like. The aralkyl metaborates used pursuant to this invention are illustrated by benzyl metaborate, 4-methylbenzyl metaborate, 3,5-diethylbenzyl metaborate, 2-phenylethyl metaborate, etc. The aryl and alkaryl metaborates are exemplified by phenyl metaborate, ortho-, meta- and para-tolyl metaborate, β-naphthyl metaborate, and the like. Sulfur-containing metaborate esters useable in this invention include such compounds as O-methyl thiometaborate; O-isopropyl thiometaborate; the various O-butyl thiometaborates; O-amyl thiometaborates; O-heptyl thiometaborates; O-dodecyl thiometaborates; O-o-, m-, and p-tolyl thiometaborates; O-benzyl thiometaborates; O-(β-phenoxyl) thiometaborate; S-ethyl metaborate; the various S-butyl metaborates; S-hexyl metaborates; S-octadecyl metaborate; S-cyclohexyl metaborate; S-phenyl metaborate; S-(β-ethoxyethyl) metaborate; S-n-propyl thiometaborate; the various S-butyl thiometaborates; S-amyl thiometaborates; S-octyl thiometaborates; S-decyl thiometaborates; S-cyclohexyl thiometaborate; S-xylyl thiometaborates; S-(β-(β-ethoxyethoxy)ethyl) thiometaborate; and the like. Mixtures of the above and related compounds can also be used.

To prepare the above metaborates, the following reactions are used:

O-substituted thiometaborates
(1) $3HSBS + B(OR)_3 \rightarrow (ROBS)_3 + B(SH)_3$ S-substituted metaborates
(2) $3HOBO + 3RSH \rightarrow (RSBO)_3 + 3H_2O$ or (3) $3H_3BO_3 + 3RSH \rightarrow (RSBO)_3 + 6H_2O$ S-substituted thiometaborates
(4) $3HSBS + 3RSH \rightarrow (RSBS)_3 + 3H_2S$ O-substituted metaborates
(5) $3HOBO + 3ROH \rightarrow (ROBO)_3 + 3H_2O$ or (6) $3H_3BO_3 + 3ROH \rightarrow (ROBO)_3 + 6H_2O$ or (7) $(RO)_3B + B_2O_3 \rightarrow (ROBO)_3$ Reactions 1 and 4 are preferably carried out in refluxing carbon disulfide. Reactions 2, 3, 5 and 6 are conveniently carried out in refluxing toluene. Reaction 7 does not require a solvent; the reaction temperature is from 100 to 150° C.

The basic nitrogen compounds which form adducts with the foregoing metaborate esters include such compounds as methyl amine; n-butyl amine; octyl amine; ethylene diamine; diisopropylamine; di-(dodecyl)-amine; triethylamine; methylethylamine; aniline; N-methyl aniline; N,N-di(decyl)aniline; ortho-, meta- and paraphenylenediamine; phenyl-β-naphthyl amine; 4-isopropylaminodiphenyl amine; N,N'-di-sec-butyl-p-phenylenediamine; pyridine; quinoline; N-n-butyl-p-amino phenol; aconitine; α-alanine; isoamyl amine; anthranilic acid; apomorphine; benzylamine; benzidine; brucine; isobutyl amine; sec-butyl amine; caffeine; cinchonidine; cinchonine; cocaine; codeine; coniine; creatine; creatinine; dissoamylamine; diisobutylamine; diethylamine; diethylbenzylamine; dimethylamine; dimethylamino-antipyrine; dimethylbenzylamine; emetine; ethanolamine; ethylamine; glycine; quanine; hydrastine; hydrazine; hydroquinine; hydroxylamine; isoquinoline; lucene; O-methoxybenzylamine; m-methoxybenzylamine; p-methoxybenzylamine; N,N-methoxybenzylamine; O-methylbenzylamine; m-methylbenzylamine; p-methylbenzylamine; N,N-methylbenzylamine; methyldiethylamine; morphine; α-naphthylamine; narceine; narcotine; nicotine; novocain; papaverine; p-phenetidine; 5-phenylamylamine; 4-phenylbutylamine; 2-phenylethylamine; 2-phenylmethylamine; phenylhydrazine; 3-phenylpropylamine; N,N-isopropylbenzylamine; physostigmine; pilocarpine; piperazine; piperidine; n-propylamine; isopropylamine; quinidine; quinine; sarcosine; semicarbazide; solanine; sparteine; strychnine; tetramethylenediamine; thebaine; o-toluidine; m-toluidine; p-toluidine; triisobutylamine; trimethylamine; trimethylenediamine; tripropylamine; veratrine; pyrrole; isopyrrole; pyrazole; imidazole; 1,2,4-isotriazole; mixtures of the foregoing and other basic nitrogen compounds, and the like.

In conducting the present process, the ratio of the borate ester to the nitrogen compound may vary over fairly wide limits. Thus, the ratio of moles of trimeric metaborate ester to moles of basic nitrogen compound may vary from about 7:1 to 1:7. However, when the process of this invention is used to liberate a basic nitrogen compound, it is preferable to employ the reactants in amounts equivalent to at least one mole of trimeric metaborate ester per mole of basic nitrogen compound. Thus, when the basic nitrogen compound contains one nitrogen atom the boron-to-nitrogen atom ratio of the reaction mixture should be at least 3:1. It is desirable to employ a slight excess of metaborate to basic nitrogen compound over this amount, particularly where the basic nitrogen compound contains a plurality of nitrogen atoms. A two- or three-fold molar excess of metaborate ester is generally sufficient to effect substantially complete reaction and greater excesses, while useable, serve no particular purpose. If the amount of metaborate ester used is less than the stoichiometric amount required to react with the basic nitrogen compound present, the adducts of this invention are formed to the point at which the metaborate ester forms the complexes and leaves excess unreacted basic nitrogen compound. The process of this invention is conducted at moderate temperatures ranging from about 0° C. to about 100° C. Deviations from this temperature range are permissible provided the temperature does not exceed the decomposition temperature of the reactants, adducts, solvent, and ancillary material with which the basic nitrogen compounds were originally associated, if any. The reaction temperature is also governed by the boiling point of the solvent or such ancillary material. Temperatures less than 0° C. can be used but are usually unnecessary to effect the process of this invention. Generally speaking, it is preferred to conduct the process of this invention at room temperature—i.e., about 20 to about 30° C. This temperature range is preferred because the reaction rate is fast, there is no need to supply heat to the reaction and the adducts are formed in high yield.

Suitable solvents in which the process of this invention is conducted advantageously include such materials as paraffinic hydrocarbons, such as pentane, hexane, 2,2,4-trimethyl pentane, undecane, etc.; aromatic hydrocarbons, such as benzene, toluene, xylene, mesitylene, etc.; cyclohexane; olefins, such as cyclohexene, diisobutylene, etc.; halogenated hydrocarbons, such as carbon tetrachloride, chloroform, bromoform, methylene dichloride, amyl chloride, bromobenzene, etc.; esters such as ethyl acetate, amyl butyl phthalate, etc.; ethers; ketones, such as acetone, methylethyl ketone, etc.; and similar inert organic solvents.

This application is a continuation-in-part of copending application Serial No. 576,775, filed April 9, 1956, now abandoned.

I claim:

1. As a new composition of matter, adducts between a trimeric metaborate ester, said ester having the formula

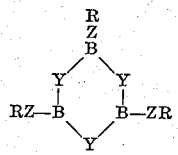

wherein R contains up to about 8 carbon atoms and is selected from the group consisting of alkyl, aralkyl, cycloalkyl, aryl, alkaryl, and alkoxyalkyl; Y and Z are selected from the group consisting of oxygen and sulfur and a basic nitrogen compound selected from the group consisting of (1) Compounds having the formula

wherein the molecule contains from zero to about 22 carbon atoms, and R, $R_1$ and $R_2$ are selected from the group consisting of hydrogen and alkyl, alkenyl, aryl, aralkyl, alkaryl, cycloalkyl, alkoxy and naphthyl radicals containing up to about 10 carbon atoms.

(2) Compounds having the formula

wherein the molecule contains from 2 to about 24 carbon atoms; R, $R_1$, $R_2$ and $R_3$ are defined as in (1) above, and $R_4$ is selected from the group consisting of aliphatic and aromatic divalent hydrocarbon groups.

(3) Compounds having the formula

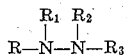

where R, $R_1$, $R_2$ and $R_3$ are selected from the group consisting of hydrogen and alkyl radicals having from one to 6 carbon atoms and aryl hydrocarbon groups containing from 6 to about 10 carbon atoms.

(4) Compounds having the formula

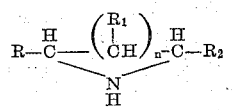

containing from 2 to about 22 carbon atoms in the molecule wherein R, $R_1$ and $R_2$ are selected from the group consisting of hydrogen and alkyl groups containing one to 6 carbon atoms, and $n$ is a small integer ranging from zero to 3; and dehydrogenated products of the aforesaid compounds containing from one to three double bonds in the ring.

(5) Compounds having the formula $$R=NH$$

where R is a bivalent radical selected from the group consisting of lower alkylidenes, cycloalkylidenes, and aralkylidene radicals having from 7 to about 10 carbon atoms.

(6) Heterocyclic nitrogen bases selected from the group consisting of morpholine, pyrazine, and quinoline, and the aforesaid heterocyclic nitrogen bases substituted with from one to 4 lower alkyl groups.

2. Process which comprises reacting a trimeric ester of a metaboric acid, said ester having the formula

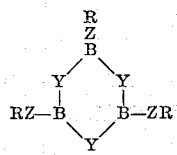

wherein R contains up to about 8 carbon atoms and is selected from the group consisting of alkyl, aralkyl, cycloalkyl, aryl, alkaryl, and alkoxyalkyl; Y and Z are selected from the group consisting of oxygen and sulfur and a basic nitrogen compound selected from the group consisting of (1) Compounds having the formula

wherein the molecule contains from zero to about 22 carbon atoms, and R, $R_1$ and $R_2$ are selected from the group consisting of hydrogen and alkyl, alkenyl, aryl, aralkyl, alkaryl, cycloalkyl, alkoxy and naphthyl radicals containing up to about 10 carbon atoms.

(2) Compounds having the formula

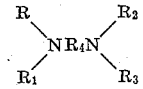

wherein the molecule contains from 2 to about 24 carbon atoms; R, $R_1$, $R_2$ and $R_3$ are defined as in (1) above, and $R_4$ is selected from the group consisting of aliphatic and aromatic divalent hydrocarbon groups.

(3) Compounds having the formula

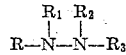

where R, $R_1$, $R_2$ and $R_3$ are selected from the group consisting of hydrogen and alkyl radicals having from one to 6 carbon atoms and aryl hydrocarbon groups containing from 6 to about 10 carbon atoms.

(4) Compounds having the formula

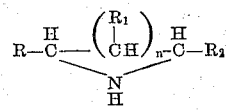

containing from 2 to about 22 carbon atoms in the molecule wherein R, $R_1$ and $R_2$ are selected from the group consisting of hydrogen and alkyl groups containing one to 6 carbon atoms, and $n$ is a small integer ranging from zero to 3; and dehydrogenated products of the aforesaid compounds containing from one to three double bonds in the ring.

(5) Compounds having the formula $$R=NH$$

where R is a bivalent radical selected from the group consisting of lower alkylidenes, cycloalkylidenes, and aralkylidene radicals having from 7 to about 10 carbon atoms.

(6) Heterocyclic nitrogen bases selected from the group consisting of morpholine, pyrazine, and quinoline, and the aforesaid heterocyclic nitrogen bases substituted with from one to 4 lower alkyl groups, said reaction being conducted in an inert essentially anhydrous solvent, said solvent being selected from the class consisting of paraffins and aromatic hydrocarbons, halogenated hydrocarbons, esters, ethers and ketones, the temperature of reaction being 0–100° C.

3. Process of liberating a basic nitrogen compound from the composition of claim 1 which comprises thermally decomposing said composition in an inert, essentially anhydrous solvent selected from the class consisting of paraffinic and aromatic hydrocarbons, halogenated hydrocarbons, esters, ethers and ketones at a temperature of 125° C. to 300° C. at which temperature said basic nitrogen compound is substantially undecomposed.

4. As a new composition of matter, the adduct between trimeric n-butyl metaborate and n-butylamine.

5. As a new composition of mater, the adduct between n-butyl metaborate and benzylamine.

6. As a new composition of matter the adduct between n-butyl metaborate and pyridine.

7. As a new composition of matter the adduct between benzyl metaborate and cyclohexylamine.

8. The process of claim 2 wherein said ester is n-butyl metaborate and said nitrogen compound is n-butylamine.

9. The process of claim 2 wherein said ester is n-butyl metaborate and said nitrogen compound is benzylamine.

10. The process of claim 2 wherein said ester is n-butyl metaborate and said nitrogen compound is pyridine.

11. The process of claim 2 wherein said ester is benzyl metaborate and said nitrogen compound is cyclohexylamine.

12. The process of claim 3 wherein said composition is the adduct between isopropyl metaborate and pyridine.

No references cited.